United States Patent
Zhang

(10) Patent No.: US 10,123,215 B2
(45) Date of Patent: Nov. 6, 2018

(54) LAYOUT METHOD AND SYSTEM FOR BASE STATION, AND COMPUTER STORAGE MEDIUM

(71) Applicant: Sanechips Technology Co., Ltd., Shenzhen, Guangdong (CN)

(72) Inventor: Linsheng Zhang, Shenzhen (CN)

(73) Assignee: SANECHIPS TECHNOLOGY CO., LTD, Shenzhen, Guangdong (CN)

(*) Notice: Subject to any disclaimer, the term of this patent is extended or adjusted under 35 U.S.C. 154(b) by 0 days.

(21) Appl. No.: 15/564,875

(22) PCT Filed: Jan. 14, 2016

(86) PCT No.: PCT/CN2016/070874
§ 371 (c)(1),
(2) Date: Oct. 6, 2017

(87) PCT Pub. No.: WO2017/000543
PCT Pub. Date: Jan. 5, 2017

(65) Prior Publication Data
US 2018/0109960 A1    Apr. 19, 2018

(30) Foreign Application Priority Data

Jun. 29, 2015   (CN) .......................... 2015 1 0367402

(51) Int. Cl.
*H04W 40/00*   (2009.01)
*H04W 16/18*   (2009.01)
(Continued)

(52) U.S. Cl.
CPC ........... *H04W 16/18* (2013.01); *H04W 16/26* (2013.01); *H04W 16/32* (2013.01);
(Continued)

(58) Field of Classification Search
None
See application file for complete search history.

(56) References Cited

U.S. PATENT DOCUMENTS 8,116,772 B2   2/2012   Dean
8,149,802 B2   4/2012   Lou
(Continued)

FOREIGN PATENT DOCUMENTS

CN   1829374 A       9/2006
CN   101057157 A    10/2007
(Continued)

OTHER PUBLICATIONS

International Search Report in international application No. PCT/CN2016/070874, dated Apr. 12, 2016, 2 pgs.
(Continued)

*Primary Examiner* — Erika A Washington
(74) *Attorney, Agent, or Firm* — Cooper Legal Group, LLC

(57) ABSTRACT

Disclosed is a layout method for a base station, including that a Base Transceiver Station/Base Station (BTS/BS) locates coordinates of a hotspot area range of a User Equipment (UE) and current coordinates of a micro cell, the BTS/BS dynamically schedules the micro cell according to the coordinates of the hotspot area range of the UE and the current coordinates of the micro cell and the BTS/BS dynamically coordinates the micro cell. Also disclosed are a layout system for a base station and a computer storage medium.

12 Claims, 5 Drawing Sheets

(51) Int. Cl.
  *H04W 84/00*    (2009.01)
  *H04W 16/26*    (2009.01)
  *H04W 16/32*    (2009.01)
  *H04W 40/22*    (2009.01)
  *H04W 64/00*    (2009.01)

(52) U.S. Cl.
  CPC .......... *H04W 84/005* (2013.01); *H04W 40/22* (2013.01); *H04W 64/003* (2013.01)

(56) References Cited

U.S. PATENT DOCUMENTS

| | | | |
|---|---|---|---|
| 2003/0017829 A1* | 1/2003 | Ching-Hsiang | H04W 16/18 455/446 |
| 2006/0002326 A1* | 1/2006 | Vesuna | H04W 16/18 370/328 |
| 2007/0140182 A1 | 6/2007 | Liu | |
| 2012/0003981 A1 | 1/2012 | Krishnamurthy | |
| 2012/0083279 A1 | 4/2012 | Likar | |
| 2013/0157651 A1 | 6/2013 | Khaitan | |
| 2013/0163565 A1 | 6/2013 | Lee | |
| 2013/0303218 A1 | 11/2013 | Teller | |
| 2014/0029450 A1* | 1/2014 | Vitek | H04W 16/28 370/252 |
| 2018/0054738 A1 | 2/2018 | Teller et al. | |

FOREIGN PATENT DOCUMENTS

| | | |
|---|---|---|
| CN | 102075223 A | 5/2011 |
| CN | 102300220 A | 12/2011 |
| CN | 102340785 A | 2/2012 |
| CN | 103269490 A | 8/2013 |
| CN | 103283276 A | 9/2013 |
| CN | 104378772 A | 2/2015 |
| EP | 1761796 A2 | 3/2007 |
| WO | 2012030875 A1 | 3/2012 |
| WO | 2012177800 A1 | 12/2012 |

OTHER PUBLICATIONS

English Translation of the Written Opinion of the International Search Authority in international application No. PCT/CN2016/070874, dated Apr. 12, 2016, 6 pgs.

Supplementary European Search Report in European application No. 16816909.2, dated Mar. 29, 2018, 9 pgs.

* cited by examiner

LAYOUT METHOD AND SYSTEM FOR BASE STATION, AND COMPUTER STORAGE MEDIUM

TECHNICAL FIELD

The disclosure relates to a base station planning technology in the field of wireless communications, and in particular to a layout method and system for a base station, and a computer storage medium.

BACKGROUND

In order to realize higher network capacity, network rate and network performance, the Long Term Evolution (LTE) and LTE-Advanced adopt a heterogeneous network of hybrid networking as a base station coverage policy, wherein the hybrid networking includes a Base Transceiver Station/Base Station (BTS/BS), a small cell, a micro cell, and a pico cell/femto cell. According to a coverage area, the number of carried users, system complexity, power consumption and other indicators, the BTS/BS, the small cell, the micro cell, and the pico cell/femto cell are sorted in a descending order. Here, the base station sorted behind is a coverage complement of the base station sorted ahead. Especially, a large number of micro cells and pico cell/femto cells are distributed in high-density buildings, sports stadiums, transportation junctions and other areas with intensive mobile terminals, which effectively functions in shunting and lightening loads for the BTS/BS and the small cell, and brings better user experience for users.

A technical solution about how to locate a base station is provided in the conventional art. Location for a base station includes that the BTS/BS locates the micro cell, that is, the BTS/BS can not only launch a satellite, but also retrieve the satellite, and the micro cell locates a User Equipment (UE), that is, the BTS/BS can assign a micro cell to track UE relay.

The technical solution about how to locate a base station includes satellite location and base station location. In a method adopting the satellite location, the method that the BTS/BS locates the micro cell includes that: first, a satellite location module is built in the micro cell, and the satellite location module calculates the distance to each satellite by searching for multiple satellites; then, the micro cell obtains its latitude and longitude and height coordinates by means of a simultaneous system of equations; finally, the micro cell sends the location result to the BTS/BS. Thus, both the BTS/BS and the micro cell obtain the location result of the micro cell. Furthermore, the method that the BTS/BS locates the UE and the method that the micro cell locates the UE are the same as the method that the BTS/BS locates the micro cell on condition that the located one has to have the satellite location module.

In a method adopting the base station location, the method that the BTS/BS locates the micro cell includes that: when the UE moves to the coverage area of the BTS/BS, the BTS/BS receives a location request of the UE or the BTS/BS actively performs initial location to the UE. Here, the initial location can be based on a cell ID location method, a single base station measurement method, a multilateral measurement method, a time difference of arrival method, or technical means like satellite plus pseudo satellite in the conventional art. After the initial location, the BTS/BS sends the location result to a display module at the UE side. The location result is longitude and latitude, height and location error range information of the UE. Herein the location error range information can be an error of 1 square kilometer or scale 1:100.

After that, if there is map information stored or it is possible to connect to a third-party map application, the display module at the UE side displays the location result sent by the BTS/BS on a map, so that a user of the UE or an automated program judges whether the location result satisfies a requirement. If the user of the UE performs judgment, the location result is judged based on a subjective judgment of the user of the UE. If it is the automated program, it is possible to compare the location result with preset standards having different errors aiming at different applications. When the location result exceeds a certain error standard, it can be considered that the location result satisfies the requirement. If the current location result does not satisfy the requirement, the next step is performed.

Next, the user of the UE can perform feedback based on the current location result, aiming to further help the BTS/BS to correct the location result or narrow the error range. Here, the feedback includes clicking the map, sending text description and voice. For example, initial location information displays that the location of the user of the UE is near the Tencent building on Shennan Avenue, while the user of the UE finds that he/she is in the south of the Tencent building next to a coffee shop. The user of the UE can select in the map the coffee shop in the south of the Tencent building, input text "coffee shop", input voice "south of the Tencent building" or "a coffee shop with a distance 10 meters to the Tencent building", or take a picture of the coffee shop, and then send information to the BTS/BS through a wireless data network. If it is the automated program judges that the location result does not satisfy the requirement at the UE side, the automated program can also record street view or environment information by enabling camera and video functions and send the information to the BTS/BS.

After that, the BTS/BS receives feedback information from the UE side, and calibrates the location result with reference to the last location information. Specifically, there is a set of databases related to geographical location and street environment at the BTS/BS side. A location or environment which is most similar to the feedback information is searched or matched in the last location error range as the new location result. Generally, the new location result has a reduced location error. Then, the BTS sends the updated location information to the UE. Note that, if it is impossible to search or match the feedback information of the UE in the last location error range, the BTS can send information about "no more accurate location result" to the UE. The UE receives the updated location result, and judges the error again to decide whether to feed back the result to the BTS/BS to calibrate. The above steps are repeated until the location result satisfies the requirement of the UE side or the UE no long performs feedback. With this, both the BTS/BS and the UE obtain the current location result of the UE. The method that the BTS/BS locates the micro cell and the method that the micro cell locates the UE are the same as the method that the BTS/BS locates the UE.

A layout method for a base station adopted in the conventional art is a fixed layout method for a base station, including simulated location, coverage analysis, dynamical adjustment of beam, how to coordinate the base station to reduce an interference, and so on. The fixed layout method for a base station adopts the technical means of one-time planning and one-time fixed layout to perform full coverage of area.

There are multiple technical problems in the fixed layout method for a base station. First, because the coverage areas of the base stations adopting same-frequency networking overlap mutually, there are very high mutual interferences among them. Different-frequency networking needs extra spectrum resources and thus the complexity of implementing different-frequency networking at an antenna of the UE end is very high. Secondly, for changes along with the time and human activities in a hotspot area of a mobile terminal or a UE (e.g. a dining hall, a conference center, a sports stadium, and other human activity areas intermittently needing ultrahigh coverage, the city center which is the hotspot in the day, and city outskirt which is the hotspot in the evening), the fixed layout method for a base station has either the technical problem of excessive layout or the technical problem that it is unable to perform layout unless a new micro cell is launched only after complaints from users.

SUMMARY

In view of this, the disclosure is intended to provide a layout method and system for a base station, and a computer storage medium, which can not only realize dynamical layout for a base station, but also adapt to real-time requirements of a UE on network coverage and network capacity.

To this end, the technical solutions of the disclosure are implemented as follows.

A layout method for a base station is provided, which includes that a BTS/BS locates coordinates of a hotspot area range of a UE and current coordinates of a micro cell; the BTS/BS dynamically schedules the micro cell according to the coordinates of the hotspot area range of the UE and the current coordinates of the micro cell; and the BTS/BS dynamically coordinates the micro cell.

In the above solution, that the BTS/BS locates the coordinates of the hotspot area range of the UE includes that: the BTS/BS locates the coordinates of UEs in its own coverage area range, and determines the coordinates of the hotspot area range of the UE according to a first preset standard.

In the above solution, that the BTS/BS dynamically schedules the micro cell according to the coordinates of the hotspot area range of the UE and the current coordinates of the micro cell includes that: the BTS/BS determines destination coordinates of the micro cell according to the coordinates of the hotspot area range of the UE; the BTS/BS sends the destination coordinates of the micro cell to the micro cell according to the current coordinates of the micro cell; and after receiving the destination coordinates of the micro cell, the micro cell moves to the destination coordinates of the micro cell according to moving track information.

In the above solution, that the BTS/BS dynamically coordinates the micro cell includes that: the BTS/BS sends coverage range information of the micro cell and coverage angle information of the micro cell to the micro cell according to the destination coordinates of the micro cell; and the micro cell performs power regulation and adjustment of antenna beam direction according to the coverage range information of the micro cell and the coverage angle information of the micro cell.

In the above solution, the micro cell directly accesses to a network; or the BTS/BS directly accesses to the network.

A layout method for a base station is also provided, which includes that: the BTS/BS locates the coordinates of the hotspot area range of the UE and the current coordinates of the micro cell in each time period, and stores big data about the coordinates of the hotspot area range of the UE and big data about the current coordinates of the micro cell in each time period; the BTS/BS dynamically schedules the micro cell in each time period according to the coordinates of the hotspot area range of the UE and the current coordinates of the micro cell in each time period, and stores big data about scheduling the micro cell; the BTS/BS dynamically coordinates the micro cell in each time period, and stores big data about coordinating the micro cell; and the BTS/BS analyzes the big data about the coordinates of the hotspot area range of the UE, the big data about the current coordinates of the micro cell, the big data about scheduling the micro cell and the big data about coordinating the micro cell; when the analysis result satisfies a second preset standard, the BTS/BS plans and generates a predicted layout for the base station.

In the above solution, that the BTS/BS dynamically schedules the micro cell in each time period according to the coordinates of the hotspot area range of the UE and the current coordinates of the micro cell in each time period includes that: the BTS/BS determines the destination coordinates of the micro cell according to the coordinates of the hotspot area range of the UE; the BTS/BS sends the destination coordinates of the micro cell to the micro cell according to the current coordinates of the micro cell; and after receiving the destination coordinates of the micro cell, the micro cell moves to the destination coordinates of the micro cell according to the moving track in formation.

In the above solution, that the BTS/BS dynamically coordinates the micro cell in each time period includes that: the BTS/BS sends the coverage range information of the micro cell and the coverage angle information of the micro cell to the micro cell according to the destination coordinates of the micro cell; and the micro cell performs the power regulation and the adjustment of antenna beam direction according to the coverage range information of the micro cell and the coverage angle information of the micro cell.

A layout system for a base station is provided, which includes:

a BTS/BS, configured to locate the coordinates of the hotspot area range of the UE and the current coordinates of the micro cell, dynamically schedule the micro cell according to the coordinates of the hotspot area range of the UE and the current coordinates of the micro cell, and dynamically coordinate the micro cell; and the micro cell, configured to receive information from the BTS/BS, and perform dynamical scheduling and dynamical coordination.

In the above solution, that the BTS/BS locates the coordinates of the hotspot area range of the UE includes that: the BTS/BS locates the coordinates of UEs in its own coverage area range, and determines the coordinates of the hotspot area range of the UE according to the first preset standard.

That the BTS/BS dynamically schedules the micro cell according to the coordinates of the hotspot area range of the UE and the current coordinates of the micro cell includes that: the BTS/BS determines the destination coordinates of the micro cell according to the coordinates of the hotspot area range of the UE; and the BTS/BS sends the destination coordinates of the micro cell to the micro cell according to the current coordinates of the micro cell.

That the BTS/BS dynamically coordinates the micro cell includes that: the BTS/BS sends the coverage range information of the micro cell and the coverage angle information of the micro cell to the micro cell according to the destination coordinates of the micro cell.

In the above solution, that the micro cell is configured to receive the information from the BTS/BS, and perform dynamical scheduling and dynamical coordination includes that: after receiving the destination coordinates of the micro cell, the micro cell moves to the destination coordinates of the micro cell according to moving track information, and performs the power regulation and the adjustment of antenna beam direction according to the coverage range information of the micro cell and the coverage angle information of the micro cell.

A layout system for a base station is also provided, which includes:

a BTS/BS, configured to locate the coordinates of the hotspot area range of the UE and the current coordinates of the micro cell in each time period, and store the big data about the coordinates of the hotspot area range of the UE and the big data about the current coordinates of the micro cell in each time period; the BTS/BS is further configured to dynamically schedule the micro cell in each time period according to the coordinates of the hotspot area range of the UE and the current coordinates of the micro cell in each time period, and store the big data about scheduling the micro cell; the BTS/BS is further configured to dynamically coordinate the micro cell in each time period, and store the big data about coordinating the micro cell; the BTS/BS is further configured to analyze the big data about the coordinates of the hotspot area range of the UE, the big data about the current coordinates of the micro cell, the big data about scheduling the micro cell and the big data about coordinating the micro cell, and when the analysis result satisfies the second preset standard, plan and generate the predicted layout of base station; and the micro cell, configured to receive the information in each time period from the BTS/BS, and perform dynamical scheduling and dynamical coordination in each time period.

In the above solution, that the BTS/BS dynamically schedules the micro cell in each time period according to the coordinates of the hotspot area range of the UE and the current coordinates of the micro cell in each time period includes that: the BTS/BS determines the destination coordinates of the micro cell according to the coordinates of the hotspot area range of the UE; and the BTS/BS sends the destination coordinates of the micro cell to the micro cell according to the current coordinates of the micro cell.

That the BTS/BS dynamically coordinates the micro cell in each time period includes that: the BTS/BS sends the coverage range information of the micro cell and the coverage angle information of the micro cell to the micro cell according to the destination coordinates of the micro cell.

In the above solution, that the micro cell receives the information in each time period from the BTS/BS, and performs dynamical scheduling and dynamical coordination in each time period includes that: after receiving the destination coordinates of the micro cell, the micro cell moves to the destination coordinates of the micro cell according to the moving track information, and performs the power regulation and the adjustment of antenna beam direction according to the coverage range information of the micro cell and the coverage angle information of the micro cell.

A computer storage medium is also provided having computer executable instructions stored therein, the computer executable instructions being used for performing the layout method for a base station.

According to the layout method and system for a base station, and the computer storage medium provided in the disclosure, the BTS/BS locates the coordinates of the hotspot area range of the UE and the current coordinates of the micro cell; the BTS/BS dynamically schedules the micro cell according to the coordinates of the hotspot area range of the UE and the current coordinates of the micro cell; and the BTS/BS dynamically coordinates the micro cell. In such a manner, the disclosure can dynamically plan the layout of a base station, reduce workload of location, simulation and analysis, and achieve the aim of fast layout. Moreover, the BTS/BS can assign the micro cell as required, so that the micro cell moves to the required area, a fixed full-coverage layout is changed into a dynamical full-coverage layout, and a fixed network capacity distribution is changed into a dynamical network capacity distribution. The BTS/BS also implements global coordination of the base station, thereby reducing interferences between the base stations and reducing coordination complexity. At the same time, the layout method and system for a base station can save energy and reduce emission, make full use of resources, and reduce excessive coverage waste, thereby achieving the aim of environment protection.

DETAILED DESCRIPTION

In embodiments of the disclosure, a BTS/BS locates coordinates of a hotspot area range of a UE and current coordinates of a micro cell; the BTS/BS dynamically schedules the micro cell according to the coordinates of the hotspot area range of the UE and the current coordinates of the micro cell; and the BTS/BS dynamically coordinates the micro cell.

The disclosure is further elaborated in combination with the accompanying drawings and the specific embodiments.

Embodiment 1

Figure 1:
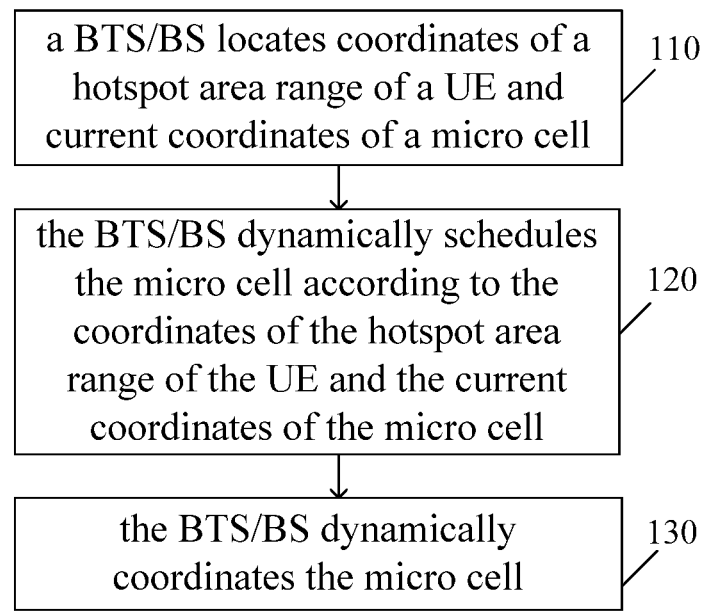
FIG. 1 is a flowchart of a layout method for a base station provided in embodiment 1 of the disclosure.

FIG. 1 is a flowchart of a layout method for a base station provided in embodiment 1 of the disclosure. As shown in FIG. 1, the method includes the following steps.

S110: a BTS/BS locates coordinates of a hotspot area range of a UE and current coordinates of a micro cell.

Here, that the BTS/BS locates the coordinates of the hotspot area range of the UE includes that: the BTS/BS locates the coordinates of the UE in its own coverage area range, and determines the coordinates of the hotspot area range of the UE according to a first preset standard.

In a specific embodiment, based on the base station location or satellite location technology in the conventional art, the BTS/BS locates and obtains information about the coordinates of all the UEs in the coverage area. Then, the BTS/BS draws coordinate distribution of all the UEs on the UE map, and determines the coordinates of the hotspot area range of the UE according to the first preset standard. Here, the first preset standard can be that when there are more than 100 UEs per square kilometer, the coverage area is the hotspot area.

Note that, the first preset standard is changing. For example, the first preset standard can be reset, or the first preset standard is that the number of accessed UEs in the coverage area reaches 50% of the current maximum access number of the BTS/BS. In addition, the coverage area may be divided fixedly. For example, the coverage area of the BTS/BS is 9 square kilometers, and the coverage area is fixedly divided into 9 parts which are named No. 1 to No. 9, wherein the coverage area of each part is 1 square kilometer, and the parts No. 1, No. 3 and No. 5 belong to the hotspot area at present. The hotspot area of the UE can also change according to time. For example, the coverage area of the BTS/BS is 9 square kilometers, and there are more than 100 UEs acting collectively. There is only one hotspot area of the UE, and the hotspot area changes along with a moving area of these 100 UEs.

S120: the BTS/BS dynamically schedules the micro cell according to the coordinates of the hotspot area range of the UE and the current coordinates of the micro cell.

In a specific embodiment, the BTS/BS dynamically schedules the micro cell according to the coordinates of the hotspot area range of the UE and the current coordinates of the micro cell may include that:

the BTS/BS determines destination coordinates of the micro cell according to the coordinates of the hotspot area range of the UE;

the BTS/BS sends the destination coordinates of the micro cell to the micro cell according to the current coordinates of the micro cell; and after receiving the destination coordinates of the micro cell, the micro cell moves to the destination coordinates of the micro cell according to moving track information.

In S120, the BTS/BS judges whether a state of UE throughput rate and a fluctuation change rate of UE throughput rate exceed a preset alarm threshold according to the located coordinates of the hotspot area range of the UE, the state of UE throughput rate and the fluctuation change rate of UE throughput rate, so as to decide whether to schedule the micro cell and which micro cells are scheduled to the hotspot area of the UE to shunt. Here, the state of UE throughput rate is the number of the UE accessing to the BTS/BS currently and data traffic; the fluctuation change rate of UE throughput rate is the number of the UE accessing to the BTS/BS currently and a change rate of the data traffic.

Moreover, the alarm threshold is that: if the number of the UE accessing to the area No. 1 currently is 80, and the average throughput rate is 80 Million Bits Per Second (Mbps); if the increase rate of the number of the UE is more than 1 per minute (1/min), that is, the number of the UE is increased by more than 1 per minute, and the increase rate of the throughput rate exceeds 1 Mbps/min, the alarm threshold is reached.

Because the BTS/BS has known all the coordinates of the UE in the coverage area, the coordinates of the hotspot area range of the UE and the current coordinates of all the micro cells, the BTS/BS can schedule the micro cell to the destination coordinates of the micro cell to shunt. Specifically, the scheduling includes that: the BTS/BS calculates the number of the micro cells for shunting according to the hotspot area of the UE, the number of the UE and the UE throughput rate, and respectively sends the destination coordinates of the micro cell to all the micro cells in a non-hotspot area. After receiving the destination coordinates of the micro cell, the micro cell moves to its destination according to moving track information planned in advance or sent by the BTS/BS. After the micro cell reaches its destination, the process of being scheduled is completed, or the BTS/BS completes scheduling.

Here, that the BTS/BS calculates the number of the micro cells for shunting includes that: shunting is performed based on the set standard. For example, one micro cell is needed for every 30 UEs or every 30 Mbps of UE data traffic.

Here, the BTS/BS determines the current location of the micro cell according to the current coordinates of the micro cell, so as to send the destination coordinates of the micro cell to the micro cell.

Figure 2:
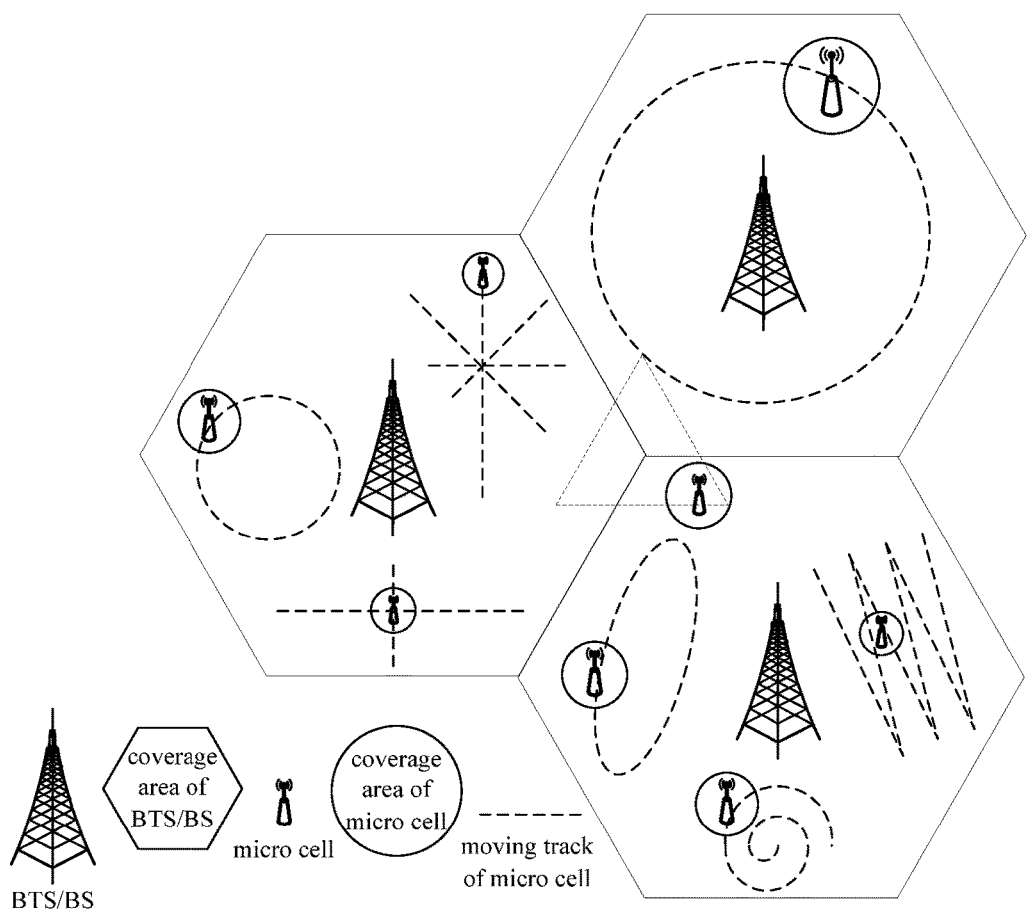
FIG. 2 is a top view of a dynamical layout of a base station provided in embodiment 1 of the disclosure.

Moreover, as shown by the dotted lines in FIG. 1 or FIG. 2, the micro cell may have a moving track planned in advance, and it is scheduled by the BTS/BS. Specifically, when scheduling the micro cell, the BTS/BS can also send the moving track information in addition to the destination coordinates of the micro cell. For example, track number order 1 represents circular movement, track number order 2 represents triangular movement, and track number order 3 represents random movement. The BTS/BS can also perform navigation in real time, for example, sending in real time the destination coordinates of the micro cell from point A to point B, from point B to point C, and from point C to the destination point D.

Note that, as shown in FIG. 2, the micro cell can use a micro cell robot and track to move on ground and floor. For example, as shown by the building in FIG. 2, the micro cell moves among different floors. The micro cell can be also launched and retrieved by balloons or unmanned aerial vehicles, thereby implementing a space-ground integrated three-dimensional layout.

Moreover, the BTS/BS communicates with the micro cell in a wired way like cable or optical fiber or in a wireless way. The BTSs/BSs communicate with each other through a Radio Network Controller (RNC) or a core network. As shown by the triangular track in FIG. 1, the BTSs/BSs can lend the micro cell to each other, thereby theoretically realizing resource sharing in the entire network and a wider range.

S130: the BTS/BS dynamically coordinates the micro cell.

Here, that the BTS/BS dynamically coordinates the micro cell may include that:

the BTS/BS sends coverage range information of the micro cell and coverage angle information of the micro cell to the micro cell according to the destination coordinates of the micro cell; and the micro cell performs power regulation and adjustment of antenna beam direction according to the coverage range information of the micro cell and the coverage angle information of the micro cell.

In S130, the BTS/BS sends an instruction about the size of the coverage area of the micro cell or an antenna beam direction, so as to coordinate the coverage area among the micro cells and reduce mutual interferences. Because the BTS/BS has known the coordinates of the UE in the coverage area, the coordinates of the hotspot area range of the UE and the current coordinates of all the micro cells, the relative locations of the micro cells, the coverage area and the antenna beam direction can be coordinated while the micro cell is scheduled to the hotspot area of the UE, thereby reducing the mutual interferences among the micro cells.

Figure 3:
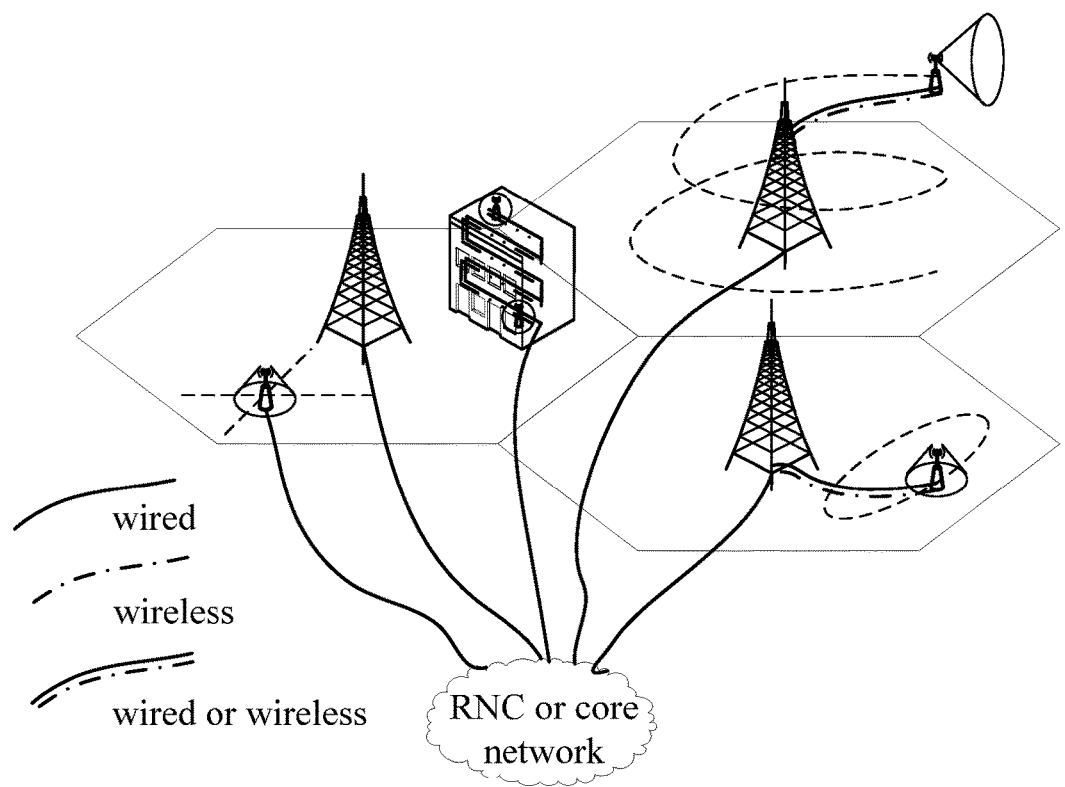
FIG. 3 is a flat view of the dynamical layout of a base station provided in embodiment 1 of the disclosure.
Figure 4:
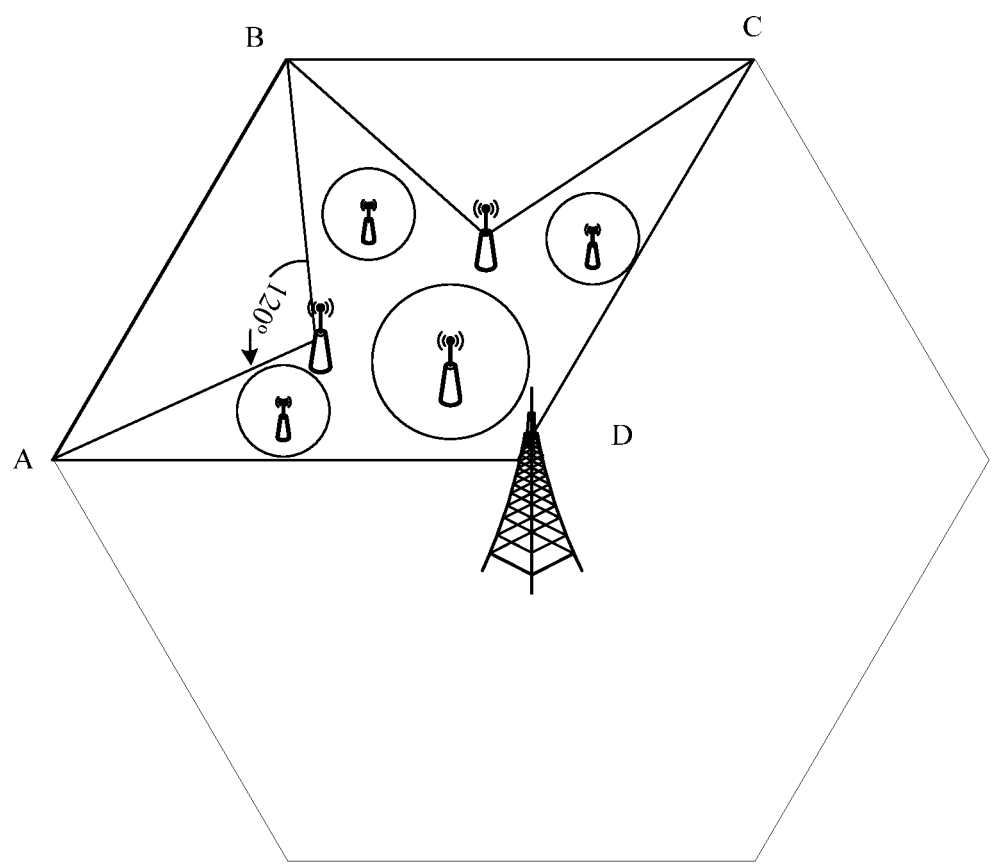
FIG. 4 is a schematic diagram of coordinating a micro cell provided in embodiment 1 of the disclosure.

As shown in FIGS. 3, A, B, C and D are the hotspot areas of the located UE and the BTS/BS schedules 6 micro cells to shunt the areas. FIG. 3 shows the layout result of the 6 micro cells. The 6 micro cells are scheduled to different areas, respectively having different coverage areas and coverage angles, namely the antenna beam directions. Specifically, when scheduling the micro cell, the BTS/BS also sends information about the coverage area of the micro cell and the coverage angle of the micro cell to the micro cell in addition to the destination coordinates of the micro cell, namely destination coordinate information. After receiving the information, the micro cell implements power regulation and adjustment of antenna beam direction after the corresponding instruction processing and execution, thereby implementing the global mutual cooperation and coordination between the BTS/BS and the micro cell, but not the mutual interferences. Here, the power regulation is changing the coverage area, and the adjustment of antenna beam direction is changing the coverage angle. As shown in FIG. 3, there is no mutual interference among the 6 micro cells, thereby maximizing the throughput of the whole system.

In a specific embodiment, the micro cell provided by the disclosure directly accesses to the network. Alternatively, the RTS/BS directly accesses to the network.

The antenna of the micro cell is connected with a Radio Remote Unit (RRU) through a coaxial cable. The RRU is connected with a Building Baseband Unit (BBU) through an optical fiber. The BBU is connected with the RNC or the core network through a network cable or optical fiber.

Moreover, a passive antenna and the RRU need to be powered. To sum up, as the thick line shown in FIG. 2, the micro cell can access to the RNC or the core network through the cable or optical cable in the wired way. When the micro cell has an active antenna or the RRU and BBU powered by batteries, the micro cell can also communicate with the BTS/BS in the wireless way, and then accesses to the network through the cable or optical cable of the BTS/BS. Here, the wireless way includes Wireless-Fidelity (WIFI), Bluetooth, and ultrasonic.

At this point, the layout process of the base station is completed.

Embodiment 2

The embodiment 2 of the disclosure provides another layout method for a base station, which includes the following steps.

S210: the BTS/BS locates the coordinates of the hotspot area range of the UE and the current coordinates of the micro cell in each time period, and stores big data about the coordinates of the hotspot area range of the UE and big data about the current coordinates of the micro cell in each time period.

Here, locating the coordinates of the hotspot area range of the UE and the current coordinates of the micro cell in each time period aims to collect big data in different time periods for use of predicating the layout.

Here, the big data about the coordinates of the hotspot area range of the UE and the big data about the current coordinates of the micro cell are a set of data about the coordinates of the hotspot area and data about the current coordinates of the micro cell which cannot be captured, managed and processed by using a common software tool in an affordable time range.

S220: the BTS/BS dynamically schedules the micro cell in each time period according to the coordinates of the hotspot area range of the UE and the current coordinates of the micro cell in each time period, and stores big data about scheduling the micro cell.

That the BTS/BS dynamically schedules the micro cell in each time period according to the coordinates of the hotspot area range of the UE and the current coordinates of the micro cell in each time period includes that: the BTS/BS determines the destination coordinates of the micro cell according to the coordinates of the hotspot area range of the UE; the BTS/BS sends the destination coordinates of the micro cell to the micro cell according to the current coordinates of the micro cell; and after receiving the destination coordinates of the micro cell, the micro cell moves to the destination coordinates of the micro cell according to the moving track information.

Here, the big data about scheduling the micro cell is a set of data about scheduling the micro cell which cannot be captured, managed and processed by using the common software tool in the affordable time range.

S230: the BTS/BS dynamically coordinates the micro cell in each time period, and stores big data about coordinating the micro cell.

That the BTS/BS dynamically coordinates the micro cell in each time period includes that:

the BTS/BS sends the coverage range information of the micro cell and the coverage angle information of the micro cell to the micro cell according to the destination coordinates of the micro cell; and the micro cell performs the power regulation and the adjustment of antenna beam direction according to the coverage range information of the micro cell and the coverage angle information of the micro cell.

S240: the BTS/BS analyzes the big data about the coordinates of the hotspot area range of the UE, the big data about the current coordinates of the micro cell, the big data about scheduling the micro cell and the big data about coordinating the micro cell; when the analysis result satisfies a second preset standard, the BTS/BS plans and generates a predicted layout of base station.

The layout method for a base station provided in embodiment 2 of the disclosure can form a predicted layout in advance based on historical learning, reduce a delay of layout, smooth the whole system performance, and improve the user experience.

For example, a large number of UEs appear in office buildings of Cell 1 during working hours, the UEs scatter in several roads of Cell 1 to Cell 2 and Cell 3 in commute time, and the UEs scatter in residential areas of Cell 3 in the evening. Partial micro cell sharing is formed among the Cells 1, 2 and 3; the micro cells gradually converge at the office buildings of Cell 1 before the working hours, scatter at two sides of roads before commute time, scatter residential buildings of Cell 3 in the evening, and are deployed in advance at two sides of roads in the morning.

Specifically, in the layout method for a base station provided in embodiment 2 of the disclosure, the BTS/BS first performs data information storage based on time for the hotspot area of the UE in the coverage area. After a dynamical layout practice of the micro cell for a period of time, these data information about scheduling layout forms the big data. Through analysis of big data, the hotspot areas in some time periods and the areas becoming from hotspot to non-hotspot can be obtained and predicted. After that, when the big data analysis and prediction exceed a second preset standard, a prediction layout scheme is planned and formed. Herein, the second preset standard includes a probability value. For example, the areas A, B, C and D have a probability of more than 80% between 8:00 and 10:00 for 30 consecutive days, that is, the areas are the hotspot areas of the UE for more than 24 days, and the areas D, E, F and G have a probability of more than 90% in the same time period, that is, the areas are the non-hotspot areas of the UE for more than 27 days. Based on the above analysis, a formed prediction layout scheme includes that: the areas A, B, C and D and the areas D, E, F and G can share the same batch of micro cells from 8:00 to 10:00 every day; at 7:55, these micro cells are scheduled to the areas A, B, C and D in advance, so that a layout scheme which is deployed before 8:00, meeting the system performance and improving the user experience, is implemented. The specific information about the number of the micro cells, the layout coordinates, the coverage area, and the antenna beam direction can also be obtained based on the historical big data.

After repeated learning, prediction and scheme adjustment, seamless dynamical scheduling without delay of the micro cell can be implemented theoretically as long as the users in the coverage area of the BTS/BS behave regularly, thereby achieving the effect that the coverage quality is equal to that of the excessive fixed layout. Because the dynamical layout needs less micro cells than the fixed layout, and the interference between the micro cells is small due to coordination of the BTS/BS, the effect is better. At the same time, a wireless communication system achieves the beneficial effects of less-is-more, distribution as required, energy conservation and emission reduction, and environment protection.

Embodiment 3

Figure 5:
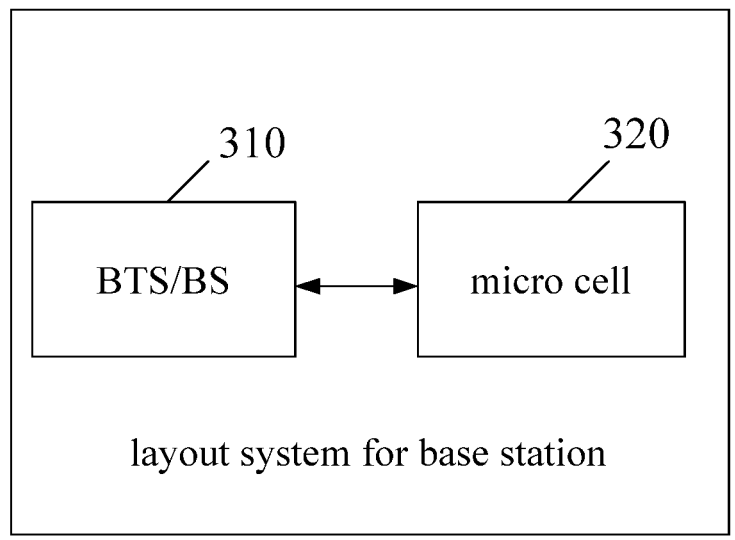
FIG. 5 is a structure diagram of a layout system for a base station provided in embodiment 3 of the disclosure.

FIG. 5 is a structure diagram of a layout system for a base station provided in embodiment 3 of the disclosure. As shown in FIG. 5, the system includes a BTS/BS 310, configured to locate the coordinates of the hotspot area range of the UE and the current coordinates of the micro cell, dynamically schedule the micro cell 320 according to the coordinates of the hotspot area range of the UE and the current coordinates of the micro cell, and dynamically coordinate the micro cell 320.

That the BTS/BS 310 is configured to locate the coordinates of the hotspot area range of the. UE includes that:

the BTS/BS locates the coordinates of the UE in its own coverage area range, and determines the coordinates of the hotspot area range of the UE according to the first preset standard.

That the BTS/BS 310 is configured to dynamically schedule the micro cell according to the coordinates of the hotspot area range of the UE and the current coordinates of the micro cell 320 includes that:

the BTS/BS determines the destination coordinates of the micro cell according to the coordinates of the hotspot area range of the UE; and the BTS/BS sends the destination coordinates of the micro cell to the micro cell 320 according to the current coordinates of the micro cell.

That the BTS/BS 310 is configured to dynamically coordinate the micro cell 320 includes that:

the BTS/BS sends coverage range information of the micro cell and coverage angle information of the micro cell to the micro cell 320 according to the destination coordinates of the micro cell.

The micro cell 320 is configured to receive the information from the BTS/BS, and perform dynamical scheduling and dynamical coordination.

That the micro cell 320 is configured to receive the information from the BTS/BS, and perform dynamical scheduling and dynamical coordination includes that:

after receiving the destination coordinates of the micro cell, the micro cell moves to the destination coordinates of the micro cell according to the moving track information, and performs power regulation and adjustment of antenna beam direction according to the coverage range information of the micro cell and the coverage angle information of the micro cell.

Embodiment 4

The embodiment 4 of the disclosure provides another layout system for a base station. The system includes the BTS/BS 410, configured to locate the coordinates of the hotspot area range of the UE and the current coordinates of the micro cell in each time period, and store the big data about the coordinates of the hotspot area range of the UE and the big data about the current coordinates of the micro cell in each time period; dynamically schedule the micro cell 420 in each time period according to the coordinates of the hotspot area range of the UE and the current coordinates of the micro cell in each time period, and store the big data about scheduling the micro cell; dynamically coordinate the micro cell 420 in each time period, and store the big data about coordinating the micro cell; analyze the big data about the coordinates of the hotspot area range of the UE, the big data about the current coordinates of the micro cell, the big data about scheduling the micro cell and the big data about coordinating the micro cell, and when the analysis result satisfies the second preset standard, plan and generate the predicted base station layout.

That the BTS/BS 410 is configured to dynamically schedule the micro cell 420 in each time period according to the coordinates of the hotspot area range of the UE and the current coordinates of the micro cell in each time period includes that:

the BTS/BS determines the destination coordinates of the micro cell according to the coordinates of the hotspot area range of the UE; and the BTS/BS sends the destination coordinates of the micro cell to the micro cell 420 according to the current coordinates of the micro cell.

That the BTS/BS 410 is configured to dynamically coordinate the micro cell 420 in each time period includes that:

the BTS/BS sends the coverage range information of the micro cell and the coverage angle information of the micro cell to the micro cell 420 according to the destination coordinates of the micro cell.

The micro cell 420 is configured to receive the information in each time period from the BTS/BS, and perform dynamical scheduling and dynamical coordination in each time period.

That the micro cell 420 is configured to receive the information in each time period from the BTS/BS, and perform dynamical scheduling and dynamical coordination in each time period includes that:

after receiving the destination coordinates of the micro cell, the micro cell moves to the destination coordinates of the micro cell according to the moving track information, and performs the power regulation and the adjustment of antenna beam direction according to the coverage range information of the micro cell and the coverage angle information of the micro cell.

The embodiment of the disclosure also recites a computer storage medium having computer executable instructions stored therein. The computer executable instructions are used for performing the layout method for a base station in embodiment 1 or embodiment 2.

Those skilled in the art should appreciate that the embodiments of the disclosure can be provided as a method, a system or a computer program product. So, the disclosure can adopt the forms of full hardware embodiment, full software embodiment, or embodiment combining software and hardware. Besides, the disclosure can adopt the form of a computer program product which is implemented on one or more computer available storage media including computer available program codes, wherein the storage media include, but are not limited to, a magnetic disk memory and a Compact Disc-ROM (CD-ROM).

The disclosure is described according to the flowcharts and/or block diagrams of the method, the device (system)

and the computer program product in the embodiments of the disclosure. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the device which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction device, wherein the instruction device implements the specified functions in one or more flows of the flowchart and/or one or more blocks of the block diagram.

These computer program instructions can also be loaded on the computer or other programmable data processing equipment, so that a series of operation steps are performed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

The above is only the preferred embodiments of the disclosure and not intended to limit the scope of protection of the disclosure; any modifications, equivalent replacements and improvements within the spirit and principle of the disclosure shall fall within the scope of protection of the disclosure.

INDUSTRIAL APPLICABILITY

In the embodiments of the disclosure, the BTS/BS locates the coordinates of the hotspot area range of the UE and the current coordinates of the micro cell; the BTS/BS dynamically schedules the micro cell according to the coordinates of the hotspot area range of the UE and the current coordinates of the micro cell; and the BTS/BS dynamically coordinates the micro cell. In such a manner, the disclosure can dynamically plan the layout of a base station, reduce workload of location, simulation and analysis, and achieve the aim of fast layout.

The invention claimed is:

1. A layout method for a base station, comprising:
locating, by a Base Transceiver Station/Base Station (BTS/BS), coordinates of a hotspot area range of a User Equipment (UE) and current coordinates of a micro cell;
dynamically scheduling the micro cell according to the coordinates of the hotspot area range of the UE and the current coordinates of the micro cell; and
dynamically coordinating the micro cell,
wherein dynamically coordinating the micro cell comprises:
sending, by the BTS/BS, coverage range information of the micro cell and coverage angle information of the micro cell to the micro cell according to destination coordinates of the micro cell so that the micro cell performs power regulation and adjustment of antenna beam direction according to the coverage range information of the micro cell and the coverage angle information of the micro cell,
wherein the destination coordinates of the micro cell are determined by the BTS/BS according to the coordinates of the hotspot area range of the UE.

2. The method according to claim 1, wherein locating, by the BTS/BS, the coordinates of the hotspot area range of the UE comprises:
locating, by the BTS/BS, coordinates of UEs in a coverage area range of the BTS/BS, and determining the coordinates of the hotspot area range of the UE according to a first preset standard.

3. The method according to claim 1, wherein dynamically scheduling the micro cell according to the coordinates of the hotspot area range of the UE and the current coordinates of the micro cell comprises:
determining, by the BTS/BS, the destination coordinates of the micro cell according to the coordinates of the hotspot area range of the UE;
sending, by the BTS/BS, the destination coordinates of the micro cell to the micro cell according to the current coordinates of the micro cell; and
after receiving the destination coordinates of the micro cell, moving, by the micro cell, to the destination coordinates of the micro cell according to moving track information.

4. The method according to claim 1, wherein the micro cell directly accesses to a network; or the BTS/BS directly accesses to the network.

5. The method according to claim 1, wherein the coordinates of the hotspot area range of the UE and the current coordinates of the micro cell comprise the coordinates of the hotspot area range of the UE and the current coordinates of the micro cell in each time period, and
wherein the method further comprises:
storing, by the BTS/BS, big data about the coordinates of the hotspot area range of the UE and big data about the current coordinates of the micro cell in each time period, big data about scheduling the micro cell and big data about coordinating the micro cell; and
analyzing, by the BTS/BS, the big data about the coordinates of the hotspot area range of the UE, the big data about the current coordinates of the micro cell, the big data about scheduling the micro cell and the big data about coordinating the micro cell; when an analysis result satisfies a second preset standard, planning and generating a predicted layout for the base station.

6. The method according to claim 1, further comprising scheduling, by the BTS/BS, micro cells to the hotspot area of the UE to shunt when the BTS/BS determines that a state of UE throughput rate and a fluctuation change rate of UE throughput rate exceed alarm thresholds according to the coordinates of the hotspot area range of the UE, the state of UE throughput rate and the fluctuation change rate of UE throughput rate,
wherein the state of UE throughput rate is a number of UE currently accessing the BTS/BS and data traffic; the fluctuation change rate of UE throughput rate is the number of UE currently accessing the BTS/BS and a change rate of the data traffic.

7. The method according to claim 6, further comprising adjusting, by the BTS/BS, relative locations of the micro cells, coverage area of the micro cells and antenna beam direction of the micro cells while scheduling the micro cells to the hotspot area of the UE.

8. The method according to claim 1, wherein dynamically scheduling the micro cell comprises:
   calculating, by the BTS/BS, a number of micro cells for shunting according to the hotspot area range of the UE, a number of UE and UE throughput rate; and
   sending, by the BTS/BS, the destination coordinates of the micro cell to each of the micro cells in a non-hotspot area, to schedule each of the micro cells in the non-hotspot area to the destination coordinates according to moving track information of the micro cells.

9. A layout system for a base station, comprising:
   a Base Transceiver Station/Base Station (BTS/BS), configured to locate coordinates of a hotspot area range of a User Equipment (UE) and current coordinates of a micro cell, dynamically schedule the micro cell according to the coordinates of the hotspot area range of the UE and the current coordinates of the micro cell, and dynamically coordinate the micro cell,
   wherein the BTS/BS dynamically coordinates the micro cell by: sending coverage range information of the micro cell and coverage angle information of the micro cell to the micro cell according to destination coordinates of the micro cell, wherein the destination coordinates of the micro cell are determined by the BTS/BS according to the coordinates of the hotspot area range of the UE; and
   the micro cell, configured to receive the coverage range information of the micro cell, the coverage angle information of the micro cell and the destination coordinates of the micro cell from the BTS/BS, move to the destination coordinates of the micro cell according to moving track information, and perform power regulation and adjustment of antenna beam direction according to the coverage range information of the micro cell and the coverage angle information of the micro cell.

10. The system according to claim 9, wherein the BTS/BS is configured to locate the coordinates of the hotspot area range of the UE by: locating the coordinates of UEs in a coverage area range of the BTS/BS, and determining the coordinates of the hotspot area range of the UE according to a first preset standard,
   wherein the BTS/BS is configured to dynamically schedule the micro cell according to the coordinates of the hotspot area range of the UE and the current coordinates of the micro cell by: determining the destination coordinates of the micro cell according to the coordinates of the hotspot area range of the UE; and sending the destination coordinates of the micro cell to the micro cell according to the current coordinates of the micro cell.

11. The system according to claim 9, wherein the coordinates of the hotspot area range of the UE and the current coordinates of the micro cell comprise the coordinates of the hotspot area range of the UE and the current coordinates of the micro cell in each time period,
   wherein the BTS/BS is further configured to store big data about the coordinates of the hotspot area range of the UE and big data about the current coordinates of the micro cell in each time period; store big data about scheduling the micro cell; store big data about coordinating the micro cell; analyze the big data about the coordinates of the hotspot area range of the UE, the big data about the current coordinates of the micro cell, the big data about scheduling the micro cell and the big data about coordinating the micro cell; and when an analysis result satisfies a second preset standard, plan and generate a predicted layout for the base station, and
   wherein the micro cell is further configured to receive information in each time period from the BTS/BS, and perform dynamical scheduling and dynamical coordination in each time period.

12. A non-transitory computer storage medium having computer executable instructions stored therein, the computer executable instructions being used for performing a layout method for a base station, wherein the method comprises:
   locating, by a Base Transceiver Station/Base Station (BTS/BS), coordinates of a hotspot area range of a User Equipment (UE) and current coordinates of a micro cell;
   dynamically scheduling the micro cell according to the coordinates of the hotspot area range of the UE and the current coordinates of the micro cell; and
   sending, by the BTS/BS, coverage range information of the micro cell and coverage angle information of the micro cell to the micro cell according to destination coordinates of the micro cell so that the micro cell performs power regulation and adjustment of antenna beam direction according to the coverage range information of the micro cell and the coverage angle information of the micro cell;
   wherein the destination coordinates of the micro cell are determined by the BTS/BS according to the coordinates of the hotspot area range of the UE.

* * * * *